United States Patent [19]

Borghard et al.

[11] Patent Number: 5,362,378
[45] Date of Patent: Nov. 8, 1994

[54] CONVERSION OF FISCHER-TROPSCH HEAVY END PRODUCTS WITH PLATINUM/BORON-ZEOLITE BETA CATALYST HAVING A LOW ALPHA VALUE

[75] Inventors: William S. Borghard, Yardley, Pa.; Robert T. Hanlon, Deptford, N.J.; Suzanne E. Schramm, Newtown, Pa.

[73] Assignee: Mobil Oil Corporation, Fairfax, Va.

[21] Appl. No.: 992,354

[22] Filed: Dec. 17, 1992

[51] Int. Cl.$^5$ .......................................... C10G 35/085
[52] U.S. Cl. ..................................... 208/138; 208/135; 208/950
[58] Field of Search ............... 208/138, 137, 135, 950

[56] References Cited

U.S. PATENT DOCUMENTS

| | | | |
|---|---|---|---|
| 3,354,078 | 11/1967 | Miale et al. | 208/120 |
| 4,016,218 | 4/1977 | Haag et al. | 260/671 |
| 4,044,063 | 8/1977 | Ireland et al. | 260/676 |
| 4,044,064 | 8/1977 | Milstein et al. | 260/676 |
| 4,046,829 | 9/1977 | Ireland et al. | 260/676 |
| 4,059,648 | 11/1977 | Derr et al. | 260/676 |
| 4,071,574 | 1/1978 | Milstein et al. | 260/676 |
| 4,080,397 | 3/1978 | Derr et al. | 260/676 |
| 4,125,566 | 11/1978 | Trin Dinh et al. | 260/676 |
| 4,133,841 | 1/1979 | Cosyns et al. | 260/676 |
| 4,234,412 | 11/1980 | Boersma et al. | 208/80 |
| 4,269,813 | 5/1981 | Klotz | 423/277 |
| 4,419,220 | 12/1983 | LaPierre et al. | 208/111 |
| 4,500,417 | 2/1985 | Chen et al. | 208/111 |
| 4,582,815 | 4/1986 | Bowes | 502/64 |
| 4,601,993 | 7/1986 | Chu et al. | 502/66 |
| 4,672,049 | 6/1987 | Chen et al. | 502/66 |
| 4,943,672 | 7/1990 | Hamner et al. | 585/737 |
| 4,995,962 | 2/1991 | Degnan, Jr. et al. | 208/110 |
| 5,075,269 | 12/1991 | Degnan et al. | 502/77 |
| 5,114,565 | 5/1992 | Zones et al. | 208/138 |

OTHER PUBLICATIONS

Encyclopedia of Chemical Technology, "Fuels, Synthetic", vol. 11, pp. 473–478, 1980.

*Primary Examiner*—Paul Lieberman
*Assistant Examiner*—Lorna M. Douyon
*Attorney, Agent, or Firm*—Alexander J. McKillop; Malcolm D. Keen; Charles A. Malone

[57] ABSTRACT

The use of high silica to alumina ratio large pore zeolites, in combination with a hydrogenation/dehydrogenation component, to convert Fischer-Tropsch heavy end products which may contain paraffins, olefins and oxygenates into low pour point distillates with high cetane number and extra high VI lube is described. The lube can be dewaxed by a conventional solvent process, by a catalytic process, or by increasing the severity of the hydroisomerization step.

28 Claims, 1 Drawing Sheet

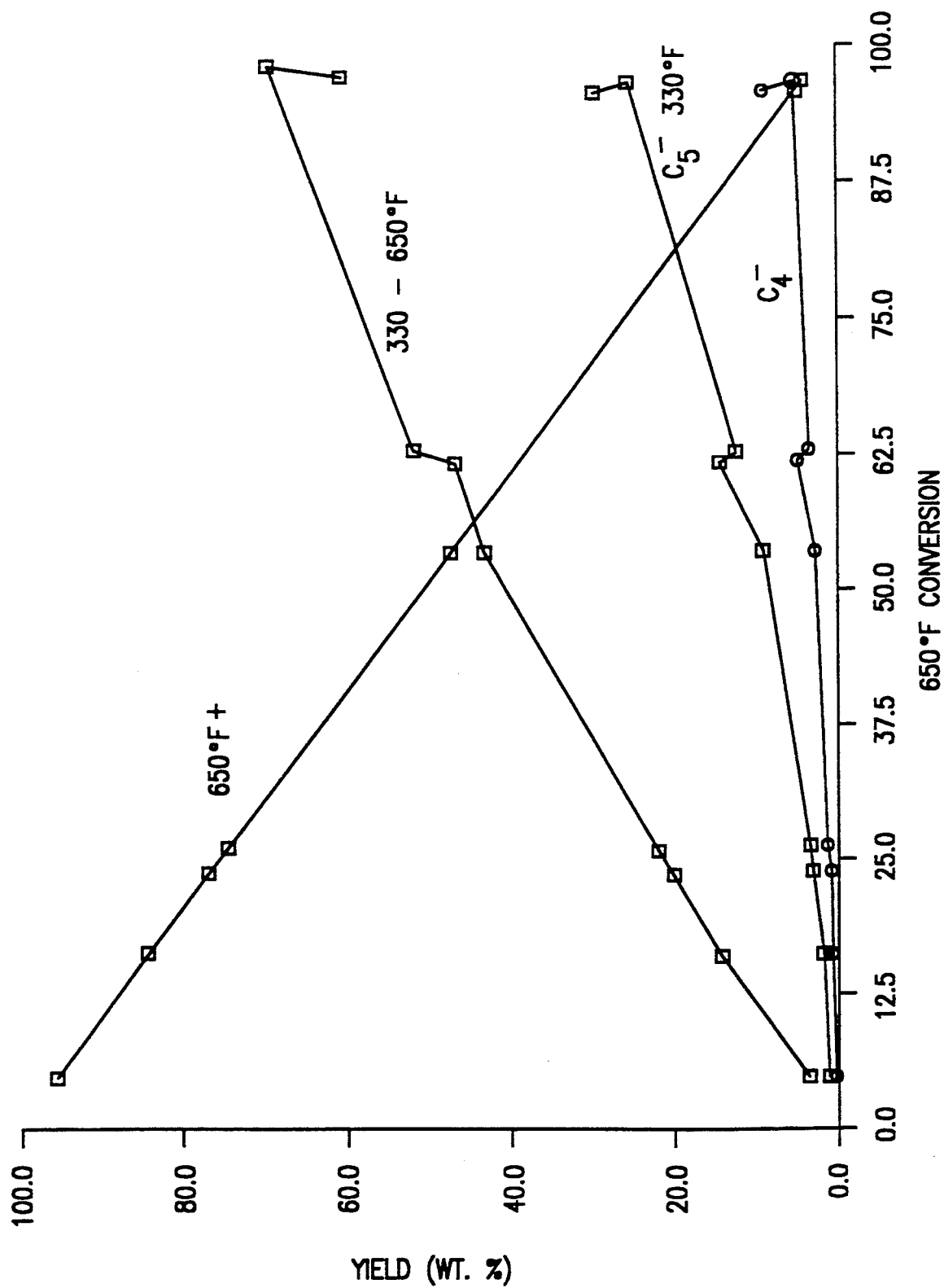

CONVERSION OF FISCHER-TROPSCH HEAVY END PRODUCTS WITH PLATINUM/BORON-ZEOLITE BETA CATALYST HAVING A LOW ALPHA VALUE

FIELD OF THE INVENTION

This invention relates to the conversion of Fischer-Tropsch heavy end products and more particularly to the conversion of Fischer-Tropsch heavy end products into low pour point distillates and lubricants of high viscosity index.

BACKGROUND OF THE INVENTION

Processes for the production of synthetic hydrocarbon fuels and lubricants from synthesis gas, a mixture of hydrogen and carbon monoxide, have been known for some time and, of them, the Fischer-Tropsch process is probably the best known. An account of the development of the process and its more notable characteristics are given in Kirk-Othmer, Encyclopedia of Chemical Technology, Third Edition, John Wiley & Sons, New York 1980, Vol 11, pp. 473-478 in the article on Synthetic Fuels.

In the Fischer-Tropsch process, synthesis gas is passed over a catalyst at elevated temperature and pressure to produce a number of carbon monoxide reduction products including hydrocarbons, alcohols, fatty acids and other oxygenated compounds. In favorable circumstances, oxygenated materials can comprise less than 1 percent of a total desired liquid product. The hydrocarbon product is highly paraffinic in nature and typically includes hydrocarbon gas, light olefins, gasoline, light and heavy fuel oils and waxy gas oils. Because the higher boiling fractions in the product are generally too waxy for general use either as liquid fuels or lubricants, further processing or upgrading is normally necessary before they can be used, either as such or by being added to the general pool of products.

Upgrading processes of various kinds are described, for example, in U.S. Pat. Nos. 4,125,566, 4,133,841 and 4,234,412 and in these processes a high boiling fraction is subjected to cracking followed by other processes such as hydrotreating in order to remove residual quantities of oxygenated materials and to increase the yield of gasoline boiling range products. U.S. Pat. No. 4,071,574 describes a process for improving the quality of the high boiling fraction, the decant oil being subjected in this case to an initial hydrogenation to saturate olefinics and to remove oxygenates, especially organic acids, after which the higher boiling materials are treated with a catalyst such as ZSM-5 to produce a material with an acceptable pour point.

A similar process is described in U.S. Pat. No. 4,044,064 in which the hydrotreated Fischer-Tropsch product is fractionated and the kerosone fraction together with the heavy oil fraction boiling above about 345° C. (650° F.) is upgraded using a ZSM-5 type catalyst. In the upgrading process described in U.S. Pat. No. 4,080,397, a mixture of light oil and higher boiling decant oil is first hydrogenated and then fractionated to form a light fraction and a heavy fraction which is subjected to selective cracking. A similar process is described in U.S. Pat. No. 4,044,063. U.S. Pat. No. 4,046,829 describes a process in which the fractionated synthesis product boiling above about 200° C. (400° F.) is first hydrogenated and then treated with a ZSM-5 type catalyst to obtain a product of lower pour point.

In U.S. Pat. No. 4,943,672 issued to Hamner, et al., Fischer-Tropsch wax is converted to a lubricating oil having a high viscosity index and a low pour point by first hydrotreating the wax under relatively severe conditions and thereafter hydroisomerizing the hydrotreated wax in the presence of hydrogen on a particular fluorided Group VIII metal-on-alumina catalyst. The hydroisomerate is then dewaxed to produce a premium lubricating oil base stock.

Degnan, Jr. et al., in U.S. Pat. No. 4,995,962 provided a process for hydroisomerizing petroleum or synthetic paraffin wax with a particular catalyst. The catalyst comprises a hydrogenating component and a layered titanate containing an interspathic polymeric oxide such as silica. The hydrogenating component may be a Group VIII metal such as Pt.

Therefore, what is needed is a process to upgrade Fischer-Tropsch heavy end products which process operates under milder conditions and does not require either a hydrotreating step or a fluorided catalyst.

SUMMARY OF THE INVENTION

A process is disclosed where certain highly siliceous, large pore zeolites may advantageously be used to convert higher boiling products of Fischer-Tropsch synthesis to low pour point distillates having an improved Cetane Number and lubricants of high viscosity index (VI).

In this process, heavy end products of Fischer-Tropsch synthesis are converted over a catalyst comprising a highly siliceous, large pore zeolite and a hydrogenation/ dehydrogenation component, usually a Group VIIIA metal of the Periodic Table (the Periodic Table used in this specification is the table approved by IUPAC and the U.S. National Bureau of Standards and shown, for example, in the Periodic Chart of the Fisher Scientific Company, Catalog No. b 5-702-10).

The crystalline microporous zeolite used herein has a silica:alumina ratio of at least about 300. Highly siliceous zeolites having the structures of Pt/[B]zeolite beta catalyst are particularly suitable. When operated under mild hydroisomerization conditions, a hydrotreating step is not required. By increasing the severity, a low pour point lube can be produced directly without a dewaxing step. In a preferred embodiment, heavy end products or wax are isomerized and cracked over a Pt/[B]zeolite beta catalyst at moderate conditions i.e., 200 to about 2,000 psig, a temperature of about 500°–700° F., and a liquid hourly space velocity(LHSV) of about 0.1 to about 2.

It is therefore an object of this invention to provide for a catalytic process for converting waxy cuts into valuable distillates with good combustion and low-temperature flow properties.

It is another object of this invention to provide a catalytic process for converting waxy cuts into a valuable lube base stock with a substantially high VI.

It is yet another object of this invention to provide a catalytic process for converting waxy cuts into a valuable lube base stock with a substantially high VI which can be produced directly from a distillation tower without the need of a separate dewaxing process.

It is a further object of this invention to provide a catalytic process for converting waxy cuts into a valuable lube base stock whereby at low severity, lube yield and VI are optimized.

It is a yet further object of this invention to provide for a catalytic process to produce a lube whereby the dewaxing step is eliminated by increasing the severity of the hydroisomerization step.

BRIEF DESCRIPTION OF THE DRAWING

The drawing is a graph which illustrates the percent of conversion of a wax and the yield obtained from various fractions or cuts thereof.

DESCRIPTION OF THE PREFERRED EMBODIMENTS

Feedstock

The feed for the present conversion process is obtained by means of the Fischer-Tropsch synthesis, in which synthesis gas, comprising hydrogen and carbon monoxide is passed over a suitable catalyst under conditions of elevated temperature and pressure. The catalyst used is typically a metal or a metal oxide, with iron, cobalt, nickel, ruthenium, thorium, rhodium or osmium being preferred. In most cases, cobalt will be used as the metal. Temperatures are typically in the range of 150° C. to 500° C. (about 300° F. to 930° F.) and pressures of 1 to 1000 Atm. Further details of the process and of suitable apparatus for carrying it out will be found in Kirk-Othmer, Synthetic Fuels, op cit and U.S. Pat. Nos. 4,046,829, 4,044,063, 4,044,064, 4,059,648, 4,080,397 and 4,071,574. These patents are hereby incorporated by reference herein.

In a typical Fischer-Tropsch operation, the synthesis gas obtained, for example, from coal by means of a suitable gasifier, is introduced into the Fischer-Tropsch converter where the carbon monoxide reduction reactions take place to form the synthesis product comprising hydrocarbons and various oxygenates such as alcohols and acids. The conversion over the Fischer-Tropsch catalyst may take place either over a fixed bed of the catalyst or in a fluidized bed of catalyst, as described in U.S. Pat. No. 4,046,829. Generally, the synthesis gas feed will be introduced at a temperature of at least 150° C. (about 300° F.) and at a pressure of at least 800 kPa (about 100 psig); during the conversion the temperature of the reactants will rise due to the exothermic nature of the reaction. The products of the reaction are then cooled and a preliminary separation of the products made. A physical separation of the products will normally lead to a decant oil stream comprising oil free of catalyst and a slurry oil stream comprising oil mixed with entrained particles of the catalyst. After the oil has been separated from the catalyst in the slurry oil stream, the oil can be combined with the decant oil for fractionation. The separation made at this stage will depend upon the nature of the synthesis product and the subsequent processing steps but typically, a light oil boiling below 250° C. (about 480° F.) and a higher boiling heavy oil can be obtained. The fractionation cut points may, of course, be adjusted as desired, as is conventional. The light oil may be treated subsequently by further cooling and washing and by other processing steps such as clay treatment and washing, as described, for example, in U.S. Pat. No. 4,046,829, which may then be followed by further separation of heavy ends by fractionation. The heavy ends so obtained may be mixed with the other heavy oil fractions which may be treated by the present upgrading process.

Whatever specific synthesis steps may be used, the present upgrading process employs a heavy oil fraction obtained from Fischer-Tropsch synthesis. This fraction is generally in the distillate boiling range or above and therefore may be characterized as having an initial boiling point of at least 150° C. (about 300° F.), although in some cases, materials of low boiling point (about 125° C.) may be included in this fraction. Preferably, the Fischer-Tropsch heavy oil fraction will have an initial boiling point above 174° C. and more preferably 343° C. (about 650° F.) since the use of a gas oil offers the possibility of producing both a distillate and a lubricating oil product. These heavy oil fractions will contain a high proportion of paraffins which give them their waxy character and in addition will contain olefins together with oxygenated compounds such as alcohols, carboxylic acids, esters and other compounds. If desired, the heavy oil fraction may be washed prior to upgrading in order to remove water soluble oxygenated compounds but if this is done, the residual water content should be reduced to an adequately low level if the catalyst used in the upgrading step is sensitive to steam. The fraction may also be passed through a guard Chamber to remove contaminants associated with the conversion of the synthesis gas.

Feedstock in addition to those mentioned above which can be used in this process include petrolatum, other heavy refinery distillates, and raffinates. Feedstock properties of a heavy wax fraction used herein are shown below in Table 1.

TABLE 1

| Feedstock Properties | |
|---|---|
| Source: | Paraflint H1 Sasolwaks Batch #5753 (Moore & Munger, Shelton, Conn.) |
| Oil Content, wt % (D3235) | 0.75% |
| 650° F.—, wt % | <1 |
| Melting Point, °C. | 102 |
| Average Molecular Mass | 814 |
| Average Carbon Number | 58 |
| Carbon Content, wt % | 85.4 |
| H2 Conent, wt % | 14.6 |
| Viscosity @ 120° C., cP (Brookfield) | 10 |
| Density: at | |
| 25° C., g/cm3 | 0.94 |
| 120° C. | 0.7662 |
| IBP @ 760 mm Hg, °F. | 734 |
| n-Paraffins | 90.% |
| i-Paraffins | 10.% |
| Aromatics | 0.% |

Catalyst

The catalyst used in the present invention comprises a large pore crystalline microporous zeolite as the acidic component and a hydrogenation-dehydrogenation component supported on the zeolite.

The preferred zeolites of this type are those which contain framework boron and normally, at least 0.1 weight %, preferably at least 0.5 weight %, of framework boron is preferred in the zeolite. In zeolites of this type, the framework consists principally of silicon tetrahedrally coordinated and interconnected with oxygen bridges. A minor amount of an element (alumina in the case of alumino-silicate zeolite beta) is also coordinated and forms part of the framework. The zeolite also contains material in the pores of the structure although these do not form part of the framework constituting the characteristic structure of the zeolite. The term "framework" boron is used here to distinguish between material in the framework of the zeolite which is evidenced by contributing ion exchange capacity to the zeolite, from material which is present in the pores and which has no effect on the total ion exchange capacity of the zeolite.

Methods for preparing high silica content zeolites containing framework boron are known and are described, for example, in U.S. Pat. No. 4,269,813; a method for preparing zeolite beta containing framework boron is disclosed in U.S. Pat. No. 4,672,049. These patents are incorporated by reference herein. As noted there, the amount of boron contained in the zeolite may be varied by incorporating different amounts of borate ion in the zeolite forming solution e.g. by the use of varying amounts of boric acid relative to the forces of silica and alumina. Reference is made to these disclosures for a description of the methods by which these zeolites may be made.

In the preferred low acidity zeolite beta catalysts, the zeolite should contain at least 0.1 weight % framework boron, preferably at least 0.5 weight % boron. Normally, the maximum amount of boron will be about 5 weight % of the zeolite and in most cases not more than 2 weight % of the zeolite. The framework will normally include some alumina and the silica:alumina ratio will usually be at least 30:1, preferably 300 to 1 in the as-synthesized conditions of the zeolite. A preferred zeolite beta catalyst is made by steaming an initial boron-containing zeolite containing at least 1 weight % boron (as $B_2O_3$) to result in an ultimate alpha value no greater than about 10 and preferably no greater than 5.

The steaming conditions should be adjusted in order to attain the desired alpha value in the final catalyst and typically utilize atmospheres of 100% steam, at temperatures of from about 800° to about 1100° F. (about 427° to 595° C.). Normally, the steaming will be carried out for about 12 to 48 hours, typically about 24 hours, in order to obtain the desired reduction in acidity. The use of steaming to reduce the acid activity of the zeolite has been found to be especially advantageous, giving results which are not achieved by the use of a zeolite which has the same acidity in its as-synthesized condition. It is believed that these results may be attributable to the presence of trivalent metals removed from the framework during the steaming operation which enhance the functioning of the zeolite in a manner which is not fully understood. Steaming can be done before or after compositing.

Although steaming has been used to reduce the acidity of zeolite beta having boron in its framework, acidic functionality may, of course, be varied in zeolite beta lacking boron, by various artifices including base exchange or control of silica:alumina ratio. These methods are discussed in U.S. Pat. No. 4,419,220 which issued to LaPierre et al. on Dec. 6, 1992 and is incorporated herein by reference.

The zeolite will be composited with a matrix material to form the finished catalyst and for this purpose conventional non-acidic matrix materials such as alumina, silica-alumina and silica are suitable with preference given to silica as a non-acidic binder, although non-acidic aluminas such as alpha boehmite (alpha alumina monohydrate) may also be used, provided that they do not confer any substantial degree of acidic activity on the matrixed catalyst. The use of silica as a binder is preferred since alumina, even if non-acidic in character, may tend to react with the zeolite under hydrothermal reaction conditions to enhance its acidity. The zeolite is usually composited with the matrix in amounts from 80:20 to 20:80 by weight, typically from 80:20 to 50:50 zeolite:matrix. Compositing may be done by conventional means including mulling the materials together followed by extrusion of pelletizing into the desired finished catalyst particles. A preferred method for extruding the zeolite with silica as a binder is disclosed in U.S. Pat. No. 4,582,815. This patent is hereby incorporated by reference herein. If the catalyst is to be steamed in order to achieve the desired low acidity, it is performed after the catalyst has been formulated with the binder, as is conventional.

The zeolite is usually composited with an active or inert binder such as aluminum, silica or silica-alumina. Zeolite loadings of 20 to 90 weight % are typical. The loading utilized is of 65 weight % zeolite beta with 35 weight % of precipitated Ultrasil ® silica. This combination is mull-mixed with NaOH and water so as to form subsequently an extrudate of 1/16 inch pellets. Next, the extrudate is ammonium exchanged by washing two times with 1.0N NH₄OH. Afterwards, the extrudate is dried at 250° F. After ammonium exchanging, the extrudate is pre-calcined at 900° F. for 3 hours in the presence of nitrogen. Calcining is conducted in air at a temperature of 1,000° F. for 6 hours. The extrudate is steamed at 1,025° F. for 16 hours and humidified at 250° F.

The extrudated zeolite beta catalyst is dried at 250° F. It is then calcined at 660° F. for 3 hours. When the extrudated catalyst is prepared it possesses the physical properties as shown below in Table 2. After preparation, the zeolite catalyst synthesized with boron has a silica to alumina ($Si/Al_2$) greater than 300.

TABLE 2

| Properties of Beta/SiO₂ | |
| --- | --- |
| Zeolite Beta content, wt % | 65 |
| Alpha Value[1] | 5–7 |
| Particle Density, g/cc | 0.972 |
| Real Density, g/cc | 2.238 |
| Pore Volume, cc/g | 0.582 |
| Surface Area, m²/g | 357 |
| Hexane Sorption, wt % | 10.1 |
| Cyclohexane Sorption, wt % | 11.7 |
| Alumina, ppmw | 2,900 |
| Boron, ppmw | 2,000 |
| Sodium, ppmw | 160 |

[1]Prior to the platinum exchange

An Alpha Value determined prior to the platinum exchange is shown in Table 2. The significance of the alpha value and a method for determining it are described in U.S. Pat. Nos. 4,016,218, 5,075,269, and in the J. of Catalysis, Vol VI, 278–287 (1966). These patents are incorporated by reference herein. When Alpha Value is examined, it is noted that the Alpha Value is an approximate indication of the catalytic cracking activity of the catalyst compared to a standard catalyst and it gives the relative rate constant (rate of normal hexane conversion per volume of catalyst per unit time). It is based on the activity of the highly active silica-alumina cracking catalyst taken as an Alpha of 1 (Rate Constant=0.016 sec-1). The Alpha Test is described in U.S. Pat. No. 3,354,078; in the Journal of Catalysis, vol. 4, p. 527 (1965); vol. 6, p. 278 (1966); and vol. 61, p. 395 (1980), each incorporated herein by reference as to that description. The experimental condition of the Alpha test used herein include a constant temperature of 538° C. and a variable flow rate as described in detail in the Journal of Catalysis, vol. 61, p. 395.

The hydrogenation-dehydrogenation component which is used is a metal component such as a noble metal. Suitable metals are selected from Group VIIIA of the Periodic Table, including the noble metals platinum, palladium, iridium, osmimum, rhodium and ruthenium. The preferred metal is platinum.

The metal component may be incorporated into the support by any suitable method such as impregnation or exchange onto the zeolite. The metal may be incorporated in the form of a cationic, anionic or neutral complex. This incorporation method and other acceptable methods for properly preparing a zeolite catalyst are discussed in U.S. Pat. No. 4,500,417 which issued to Chen et al. on Feb. 19, 1985. A method for preparing a Pt Beta zeolite is discussed in U.S. Pat. No. 4,419,220 which issued to LaPierre et al. on Dec. 6, 1983. Use of a zeolite Beta in conjunction with the dewaxing of lubricating oils is discussed in U.S. Pat. No. 4,601,993 which issued to Chu et al. on Jul. 22, 1986. These patents are hereby incorporated by reference herein.

Platinum is incorporated into the extrudated catalyst by ion exchanging with a 0.2N $NH_4NO_3/Pt(NH_3)_4Cl_2$ solution.

The Pt/[B]zeolite beta catalyst used herein contains a nominal 0.6 wt % Pt exchanged onto a silica-bound boron [B]zeolite beta extrudate which has an alpha value of about 5. Said catalyst is a zeolite beta with a platinum hydrogenating component.

Process Conditions

The feedstock is contacted with the catalyst in the presence of hydrogen under conditions of elevated temperature and pressure. The conditions used e.g. temperature, pressure, space velocity and hydrogen ratio, may be similar to those used in conventional hydroisomerization operations although the use of highly siliceous zeolite catalysts may permit the total pressure requirements to be reduced and the absence of polycyclic aromatic materials in the feedstock will preclude the normal hydrocracking reactions from taking place. A Fischer-Tropsch process which can be used with the catalyst disclosed herein is disclosed by Hamner, deceased et al. in U.S. Pat. No. 4,943,672 that issued on Jul. 24, 1990. This patent is hereby incorporated by reference herein.

Process temperatures of 200° C. to 500° C. (about 400° F. to 930° F.) may conveniently be used although temperatures above 425° C. (800° F.) will normally not be employed. Generally, temperatures of 300° C. to 425° C. (570° F. to 800° F.) will be employed. As is preferred, the temperatures will be about 500° to about 700° F. Total pressure is usually in the range of 200 to 16,000 kPa (25 to 2000 psig) and the lower pressures within this range of about 300 to about 500 psig will normally be preferred. The process is operated in the presence of hydrogen and hydrogen partial pressures will normally be from 600 to 6,000 kPa (72 to 2305 psig). The ratio of hydrogen to the hydrocarbon feedstock (hydrogen circulation rate) will normally be from 10 to 3,500 normal liters per liter (56 to 19,660 SCF/bbl). The space velocity of the feedstock will normally be from 0.1 to 20 LHSV, preferably 0.1 to 2 LHSV.

During the reaction, substantial conversion to lower boiling products, especially those in the distillate range (165°–343° C., 330°–650° F.) takes place. Naphtha and dry gas may also be produced in substantial amounts. At the same time, however, the n-paraffins present in the feed and those produced by cracking are subjected to isomerization, depending upon the nature of the catalyst. Although all of the preferred highly siliceous large pore zeolites will produce a certain degree of isomerization to the less waxy iso-paraffins, resulting in a lower pour point for the product, it has been found that the highly siliceous forms of zeolite beta are the most effective in this respect. The forms of zeolite beta with silica:alumina ratios of at least 30:1 and preferably over 300:1, are preferred for this reason. It has also been found that the present catalysts not only promote the conversion of the feed to lower boiling products but also bring about a reduction in the pour point of the feed, thereby producing a material which, by reason of its lower pour point and good viscosity index (attributable to its substantially paraffinic nature), is highly suitable as a lubricating oil base stock.

The conversion may be conducted by contacting the feedstock with a fixed stationary bed of catalyst, a fixed fluidized bed or with a transport bed. A simple configuration is a trickle-bed operation in which the feed is allowed to trickle through a stationary fixed bed. With such a configuration, it is desirable to initiate the reaction with fresh catalyst at a moderate temperature which is of course raised as the catalyst ages, in order to maintain catalytic activity. The catalyst may be regenerated by contact at elevated temperature with hydrogen gas, for example, or by burning in air or other oxygen-containing gas.

Products

The distillate boiling range products which may be obtained by the present upgrading process are characterized by a high content of isoparaffins and a very low content of sulfur- and nitrogen-containing compounds. Because of the high isoparaffin content, the pour point (ASTM D-97) of the distillate products are anticipated to be at or below −18° C. (about 0° F.). In addition, these products are extremely low in aromatics so that they are highly suitable as premium quality jet fuels. Their high Cetane Index will also make them good diesel fuels, a utility which is, of course, enhanced by their low sulfur content.

The higher boiling fractions (650° F.+) which are obtained from the upgrading process are also highly paraffinic materials which confer a high viscosity index (ASTM D-2270) upon them, making them highly desirable lubricant base stocks. However, because the paraffins are present mainly as isoparaffins, the product will have a low pour point in addition to the desired high viscosity index. In general, the pour point (ASTM D-97) will be below 0° C. (32° F.) and in some cases below −18° C. (about 0° F.). Viscosity Indices will normally be above 150 and may even be as high as 170 or even higher. A VI of 175 has been obtained.

The present process is therefore notable for its ability to upgrade Fischer-Tropsch heavy fractions to produce both distillate and lubricant products which are notable for their low pour point and their minimal content of heterocyclic (nitrogen and sulfur) compounds. The process may be operated under conditions of high severity to increase the proportionate yield of distillate range product, if this is desired or, alternatively, the proportion of lube product may be maximized by operation under low severity conditions. By suitable choice of operating conditions, both distillate and lube products may be obtained.

The invention is illustrated by the following Examples in which all parts, proportions and percentages are by weight unless stated to the contrary. Examples 2 and 3 below illustrate the preparation of the highly siliceous zeolite catalysts.

The invention is illustrated by the following Example in which all parts, proportions and percentages are by weight unless stated to the contrary.

EXAMPLE 1

The Pt/[B]zeolite beta catalyst as mentioned in Table 2 was used for the upgrading of a Fischer-Tropsch wax by hydroisomerization to form high-quality diesel fuel and potentially premium lubes. This wax was isomerized and cracked over the catalyst at moderate conditions (400 psig, 600°-630° F., 0.5 LHSV) to produce the following:

| Cracking Severity | Low | High |
|---|---|---|
| 650° F.+ Conversion | 24 | 62 |
| Wax Conversion | 83 | 100 |
| Diesel Fuel 330-650° F. Yld | 20 | 46 |
| Cetane Number* | 74 | 72 |
| 650° F.+ Distilled Btms MEK dewaxing yld | 77 | 100 - no dewaxing required |
| Lube Yld, wt % feed | 59 | 38 |
| Lube kV @ 100° C., cSt | 5.5 | 4.4 |
| Lube VI | 170 | 151 |
| Lube Pour Point, °F. | +10 | 0 |

*Estimated from $^1$H NMR.

At low severity, lube yield is optimized at 59 wt % and 170. Increasing severity increases diesel yield at the expense of lower lube yield, viscosity, and VI. However, these debits to the lube yield/quality may be offset by the higher dewaxing yield, especially at the point (~60 wt % 650° F.+conversion) where no further dewaxing of the distilled bottoms is required to produce a lubes base stock. Cetane numbers of the distillate fractions were estimated by a nuclear magnetic resonance(NMR) technique.

This example illustrates that Fischer-Tropsch wax can be processed over Pt/[B]zeolite beta at 24% 650° F.+conversion to yield 60% lube (170 VI) and 20% diesel (70+cetane number). Increasing conversion to increase diesel yield results in decreased lube yield and VI. However, at high conversion (~60%), high quality lube (VI>150) can be produced directly upon distillation without the need of additional dewaxing.

The following examples illustrate the preparation of the Pt/[B]zeolite beta catalyst which is used above.

EXAMPLE 2

A representative boron-containing zeolite beta catalyst can be prepared by crystallizing the following mixture at 285° F. (140° C.) for 13 days, with stirring:

| Boric acid, g. | 57.6 |
|---|---|
| NaOH, 50%, ml. | 66.0 |
| TEABr, ml. | 384 |
| Seeds, g. | 37.0 |
| Silica, g. | 332 |
| Water, g. | 1020 |

Notes:
1. TEABR = Tetraethylammonium bromide, as 50% aqueous solution.
2. Silica = Ultrasil ® silica.

The calcined product is expected to have the following analysis and conform to the structure of zeolite beta by x-ray diffraction:

| $SiO_2$ | 76.2 |
|---|---|
| $Al_2O_3$ | 0.3 |
| B | 1.08 |
| Na, ppm | 1070 |
| N | 1.65 |
| Ash | 81.6 |

EXAMPLE 3

An as-synthesized boron-containing zeolite beta of Example 2 is mulled and extruded with silica in a zeolite:silica weight ratio of 65:35, dried and calcined at 900° F. (480° C.) for 3 hours in nitrogen, followed by 1,000° F. (540° C.) in air for three hours. The resulting extrudate is exchanged with 1N ammonium nitrate solution at room temperature for 1 hour after which the exchanged catalyst was calcined in air at 1,000° F. (540° C.) for 3 hours, followed by 24 hours in 100 percent steam at 1,025° F. (550° C.). The steamed extrudate will be found to contain 0.48 weight percent boron (as $B_2O_3$), 365 ppm sodium and 1920 ppm $Al_2O_3$. The steamed catalyst is then exchanged for 4 hours at room temperature with 1N platinum tetraammine chloride solution with a final calcination at 660° F. (350° C.) for three hours. The finished catalyst is expected to contain 0.87 weight % platinum and have an alpha value of 4. The catalyst is sized to 20/40 mesh and 10 cc (5.46 g) is loaded into a standard ½ inch inside diameter reactor. If desired it can be sulfided at atmospheric pressure with 2% $H_2S/H_2$ programmed up to 750° F. and held overnight.

Obviously, many other variations and modifications of this invention as previously set forth may be made without departing from the spirit and scope of this invention as those skilled in the art readily understand. Such variations and modifications are considered part of this invention and within the purview and scope of the appended claims.

What is claimed is:

1. A process for upgrading a waxy heavy oil fraction produced by a Fischer-Tropsch synthesis comprising:
   contacting said feed and hydrogen gas under isomerization conversion conditions including a temperature of from about 500° F. to about 700° F, a pressure of about 200 psig to about 2,000 psig, and a liquid hourly space velocity (LHSV) of about 0.1 to about 2, with a catalyst comprising zeolite beta having an alpha value less than about 10 modified with a metal selected from a member of the group consisting of boron, tin, lead, or indium composited with a hydrogenation metal for a time sufficient to convert the heavy oil fraction to form a product that contains a hydrocarbon distillate fraction and a heavy hydrocarbon fraction suitable for conversion to a lubricating oil with a substantially improved viscosity index (VI).

2. The process as recited in claim 1 where the catalyst is modified with boron, the hydrogenation metal is platinum, the temperature is about 600° F, with a LHSV of about 0.5, whereupon a distillate is produced having a cetane number of about 75 and the heavy hydrocarbon fraction has a pour point of about 10° F. with a VI of about 170.

3. The process as recited in claim 1 where a substantially paraffinic fraction is produced at a high severity which has a pour point of 0° F. that is obtained directly upon distillation without a dewaxing step.

4. The process as recited in claim 1 where the catalyst is modified with boron and the hydrogenation metal is platinum.

5. The process as recited in claim 1 where the waxy heavy oil feed produced by the Fischer-Tropsch synthesis comprises a distillation cut boiling above about 800° F.

6. The process as recited in claim 1 where said zeolite beta catalyst has a silica to alumina ratio of at least about 300:1.

7. The process as recited in claim 1 where the waxy heavy oil feed boils above about 800° F. and the distillate fraction boils between about 330° F. to about 650° F.

8. The process as recited in claim 1 where the waxy heavy oil fraction feed boils above about 800° F. and the heavy hydrocarbon fraction boils above about 650° F.

9. The process as recited in claim 1 where the waxy heavy oil fraction feed is a raffinate.

10. A process for upgrading a waxy heavy oil fraction feed having a boiling point of at least 650° F and which is comprised of a substantially paraffinic material comprising:
contacting said feed and hydrogen gas under isomerization conversion conditions in the presence of hydrogen at a hydrogen partial pressure of at least 200 psig and in the presence of a low acidity zeolite isomerization catalyst having an alpha value of not more than about 10 and comprising a noble metal hydrogenation component on a porous, zeolite support material, thereby isomerizing said feed so as to form a product containing a hydrocarbon distillate fraction and a heavy hydrocarbon fraction suitable for conversion to a lubricating oil with a substantially improved viscosity index.

11. The process as recited in claim 10 where the catalyst is beta zeolite catalyst.

12. The process as recited in claim 10 where the catalyst is a beta zeolite catalyst modified with boron, the hydrogenation metal is platinum where upon a distillate is produced having a cetane number of about 75 and the heavy hydrocarbon fraction has a pour point of about 10° F. with a VI of about 170.

13. The process as recited in claim 10 where the heavy hydrocarbon fraction is produced at a high severity and has a pour point of 0° F. that is obtained directly upon distillation without a dewaxing step.

14. The process as recited in claim 10 where the catalyst is modified with boron and the hydrogenation metal is platinum.

15. The process as recited in claim 10 where the catalyst is beta zeolite modified with boron and the hydrogenation metal is platinum.

16. The process as recited in claim 10 where the catalyst is a beta zeolite catalyst which has a silica to alumina ratio of at least about 300:1.

17. The process as recited in claim 1 where the heavy hydrocarbon fraction boils above about 650° F.

18. The process as recited in claim 1 where the distillate fraction boils between about 330° to about 650° F.

19. The process as recited in claim 10 where the heavy oil fraction is produced by a Fischer-Tropsch synthesis or comprises a raffinate.

20. The process as recited in claim 10 where said catalyst is a boron-containing beta zeolite isomerization catalyst where the boron is present as a framework component of the beta zeolite catalyst.

21. The process as recited in claim 10 where said catalyst is a boron-containing beta zeolite isomerization catalyst where the boron is present as a framework component of the beta zeolite catalyst and the noble metal is platinum in an amount of about 0.5 to about 2 weight %.

22. The process as recited in claim 10 where the isomerization conversion conditions include a temperature of from about 500° to about 700° F, a pressure of about 200 to about 2,000 psig, and a liquid hourly space velocity of about 0.1 to about 2.

23. The process as recited in claim 10 where conversion of said feed during the isomerization step is from about 24 to about 100 weight % and the heavy hydrocarbon fraction has a VI of from about 151 to about 175 while a distillate fraction is obtained having a cetane number of about 67 to about 74.

24. A process for upgrading a waxy heavy oil fraction produced by a Fischer-Tropsch synthesis comprising:
contacting said feed and hydrogen gas under isomerization conversion conditions including a temperature of from about 500°–700° F, a pressure of about 200 psig to about 2,000 psig, and a liquid hourly space velocity (LHSV) of about 0.1 to about 2, with a catalyst comprising zeolite beta having an alpha value of not more than about 10 composited with a hydrogenation metal for a time sufficient to convert the heavy oil fraction to form a product that contains a hydrocarbon distillate fraction and a heavy hydrocarbon fraction suitable for conversion to a lubricating oil with a substantially improved viscosity index.

25. The process as recited in claim 24 where boron is present as a framework component of the zeolite beta catalyst.

26. The process as recited in claim 24 in which the zeolite beta is modified with a metal in its framework which metal is selected from a member of the group consisting of boron, tin, lead or indium.

27. The process as recited in claim 24 in which the zeolite beta is modified with a metal in its framework which metal is selected from a member of the group consisting of boron, tin, lead or indium and the hydrogenation metal is platinum.

28. The process as recited in claim 24 where said catalyst comprises from about 0.5 to about 2 wt. % platinum on a support comprising boron-containing zeolite beta which has boron as a framework component of a zeolite beta and a matrix.

* * * * *